United States Patent
He et al.

(10) Patent No.: US 12,265,253 B2
(45) Date of Patent: Apr. 1, 2025

(54) LOW LOSS FIBER-TO-CHIP INTERFACES FOR LITHIUM NIOBATE PHOTONIC INTEGRATED CIRCUITS

(71) Applicant: President and Fellows of Harvard College, Cambridge, MA (US)

(72) Inventors: Lingyan He, Cambridge, MA (US); Mian Zhang, Cambridge, MA (US); Amirhassan Shams-Ansari, Cambridge, MA (US); Marko Loncar, Belmont, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 190 days.

(21) Appl. No.: 17/407,856

(22) Filed: Aug. 20, 2021

(65) Prior Publication Data

US 2021/0382232 A1 Dec. 9, 2021

Related U.S. Application Data

(63) Continuation of application No. PCT/US2020/019306, filed on Feb. 21, 2020.
(Continued)

(51) Int. Cl.
*G02B 6/122* (2006.01)
*G02B 6/12* (2006.01)
(Continued)

(52) U.S. Cl.
CPC ....... *G02B 6/1228* (2013.01); *G02B 6/12004* (2013.01); *G02B 6/14* (2013.01);
(Continued)

(58) Field of Classification Search
CPC .... G02B 6/1228; G02B 6/12004; G02B 6/14; G02B 6/305; G02B 2006/1204; G02B 2006/12061; G02B 2006/12097
See application file for complete search history.

(56) References Cited

U.S. PATENT DOCUMENTS 8,891,913 B1 11/2014 Roth et al.
9,885,832 B2 * 2/2018 Lambert .................. G02B 6/14
(Continued)

FOREIGN PATENT DOCUMENTS

WO WO-2020/172585 A1 8/2020

OTHER PUBLICATIONS

International Search Report and Written Opinion for International Application No. PCT/US2020/019306 dated May 20, 2020.
(Continued)

*Primary Examiner* — Tina M Wong
(74) *Attorney, Agent, or Firm* — Potomac Law Group, PLLC (57) ABSTRACT

Low loss fiber-to-chip interfaces for lithium niobate photonic integrated circuits are provided. An optical circuit includes a waveguide comprising an electro-optical material. The waveguide includes an elevated ridge and a slab underlying the elevated ridge, the elevated ridge and the slab extending along a central axis toward an optical interface. The elevated ridge and the slab each have a plurality of cross-sections along the central axis, each cross-section having a width measured perpendicular to the central axis, wherein the width of elevated ridge is smaller than the width of the slab for every cross-section along the central axis. The elevated ridge includes a tapered portion having a first taper, wherein the cross-section of the elevated portion decreases along the central axis toward the optical interface. The slab includes a tapered portion having a second taper, wherein the (Continued)

cross-section of the slab decreases along the central axis toward the optical interface. The slab extends beyond the elevated ridge along the central axis to the optical interface.

20 Claims, 12 Drawing Sheets

Related U.S. Application Data (60) Provisional application No. 62/809,386, filed on Feb. 22, 2019.

(51) Int. Cl.
*G02B 6/14* (2006.01)
*G02B 6/30* (2006.01)

(52) U.S. Cl.
CPC ...... *G02B 6/305* (2013.01); *G02B 2006/1204* (2013.01); *G02B 2006/12061* (2013.01); *G02B 2006/12097* (2013.01)

(56) References Cited

U.S. PATENT DOCUMENTS

2015/0346429 A1    12/2015   Lambert et al.
2017/0003450 A1     1/2017   Rickman et al.

OTHER PUBLICATIONS

Studenkov et al., "Efficient coupling in integrated twin-waveguide lasers using waveguide tapers," IEE Photonics Technology Letters, 11(9):1096-1098 (1999).

\* cited by examiner

LOW LOSS FIBER-TO-CHIP INTERFACES FOR LITHIUM NIOBATE PHOTONIC INTEGRATED CIRCUITS

CROSS-REFERENCE TO RELATED APPLICATIONS

This application is a continuation of International Application No. PCT/US2020/019306, filed Feb. 21, 2020, which claims the benefit of U.S. Provisional Application No. 62/809,386, filed Feb. 22, 2019, each of which is hereby incorporated by reference in its entirety.

STATEMENT REGARDING FEDERALLY SPONSORED RESEARCH OR DEVELOPMENT

This invention was made with government support under 1541959 awarded by the National Science Foundation. The government has certain rights in the invention.

BACKGROUND

Embodiments of the present disclosure relate to photonic integrated circuits, and more specifically, to low loss fiber-to-chip interfaces for lithium niobate photonic integrated circuits.

BRIEF SUMMARY

According to various embodiments of the present disclosure, an optical circuit is provided. The optical circuit includes a waveguide comprising an electro-optical material. The waveguide includes an elevated ridge and a slab underlying the elevated ridge, the elevated ridge and the slab extending along a central axis toward an optical interface. The elevated ridge and the slab each have a plurality of cross-sections along the central axis, each cross-section having a width measured perpendicular to the central axis, wherein the width of elevated ridge is smaller than the width of the slab for every cross-section along the central axis. The elevated ridge includes a tapered portion having a first taper, wherein the cross-section of the elevated portion decreases along the central axis toward the optical interface. The slab includes a tapered portion having a second taper, wherein the cross-section of the slab decreases along the central axis toward the optical interface. The slab extends beyond the elevated ridge along the central axis to the optical interface.

In some embodiments, the electro-optical material comprises lithium niobate or lithium tantalate. In some embodiments, the first taper and the second taper, each independently, is defined by a curve selected from the group consisting of linear, polynomial, and exponential.

In some embodiments, the optical circuit, further includes a substrate underlying the slab. In some embodiments, the substrate comprises silicon, quartz, sapphire, fused silica, or lithium niobate.

In some embodiments, a cladding is disposed on the waveguide, the cladding comprising a dielectric material.

In some embodiments, the optical circuit further includes an optical guide disposed on the slab along the central axis. The optical guide is in optical communication with the elevated ridge. The optical guide extends beyond the elevated ridge along the central axis toward the optical interface. The optical guide has a refractive index of 2.25 or less.

According to various embodiments of the present disclosure, a method of interfacing with an optical waveguide is provided. A guided mode is directed to an optical interface of a waveguide, the waveguide comprising an electro-optical material. The waveguide includes an elevated ridge and a slab underlying the elevated ridge, the elevated ridge and the slab extending along a central axis toward the optical interface. The elevated ridge and the slab each has a plurality of cross-sections along the central axis, each cross-section having a width measured perpendicular to the central axis, wherein the width of elevated ridge is smaller than the width of the slab for every cross-section along the central axis. The elevated ridge includes a tapered portion having a first taper, wherein the cross-section of the elevated portion decreases along the central axis toward the optical interface. The slab includes a tapered portion having a second taper, wherein the cross-section of the slab decreases along the central axis toward the optical interface. The slab extends beyond the elevated ridge along the central axis to the optical interface.

DETAILED DESCRIPTION

Integrated lithium niobate (LN) photonic circuits are useful for advanced photonic functions such as high-speed modulation, nonlinear frequency conversion, and frequency comb generation. For practical applications, optical interfaces that feature low fiber-to-chip coupling losses are essential. Fiber-to-chip loss (commonly >10 dB/facet) generally dominates the on-chip losses (0.03-0.1 dB/cm), thus limiting the potential of integrated LN photonics platform.

To address this and other shortcomings of alternative approaches, the present disclosure demonstrates a low loss mode size converter for coupling between a standard lensed fiber and sub-micrometer LN rib waveguides. The coupler consists of two inverse tapers that convert the small optical mode of a rib waveguide into a symmetric guided mode of a LN nanowire, featuring a larger mode area matched to that of a tapered optical fiber. The measured fiber-to-chip coupling loss is as low as 1.7 dB/facet with a high fabrication tolerance and repeatability. These results show that integrated LN photonic circuits can be efficiently interfaced with optical fibers.

Integrated lithium niobate (LN) photonics has broad applicability, due to the attractive material properties including a large second-order nonlinear susceptibility, a large piezoelectric response, a wide optical transparency window, a high refractive index, and thin-film LN-on-insulator (LNOI) nanofabrication technology. A wide range of nanophotonic and electro-optical devices including microring resonators, photonic crystal cavities, and microdisk resonators may be used to achieve advanced optical functionalities on-chip such as electro-optic (EO) modulation, second harmonic generation, wavelength conversion, EO frequency comb and Kerr frequency comb generation. These on-chip functionalities are applicable to integrated optical solutions in optical communication, spectroscopy and sensing, and microwave photonics.

However, a major challenge for practical applications of integrated LN photonics is an interface between the micrometer-scale LN devices with conventional optical fibers. Ultra-low loss fiber-to-chip optical coupling is crucial for most applications including electro-optic modulators and frequency comb generation since the performance of these systems deteriorates dramatically with increased optical coupling loss. For example, LN modulators that feature large bandwidth, low driving voltage and low on-chip losses, suffer from large insertion loss (fiber-to-fiber loss) in excess of 10 dB. This is due to large mismatch between mode size and mode index of optical fiber and the nanophotonic LN waveguide. Such a high insertion loss prevents these high performance modulators to reach they true potential and find practical applications. Increasing the on-chip optical mode size is therefore important to enable efficient coupling, and additionally improves the alignment tolerance during packaging and assembly.

The present disclosure demonstrates an on-chip lithium niobate bilayer inverse tapered mode size converter that experimentally achieves a fiber-to-chip coupling loss as low as 1.7 dB/facet (fiber-to-fiber insertion loss of 3.4 dB) through an optimized nanofabrication process at telecom wavelengths. With more precise fabrication techniques, <0.5 dB/facet coupling loss can be achieved. This is a substantial improvement over alternative fiber-chip interfaces on thin-film LN devices that use grating couplers with an insertion loss of ~10 dB or higher, and end-fire couplings, which is ~6 dB/facet on a hybrid silicon nitride-thin film LN platform.

Many integrated LN devices rely on rib waveguide geometry, with trapezoidal cross-section. The former is desired to improve the EO efficiency due to large dielectric constant of LN at RF frequencies, while the latter is the consequence of physical etch used to fabricate the waveguides. As a result, many single layer inverse taper designs based on tapering the rib portion only are not suitable since they push optical mode to the LN slab resulting in poor coupling efficiency. Therefore, efficient couplers for rib waveguide structures require a bilayer taper to convert the etched rib waveguide mode to a near circularly symmetric output mode. In various approaches provided herein, this is accomplished by adiabatically tapering the bottom slab layer as well.

Figure 1A:
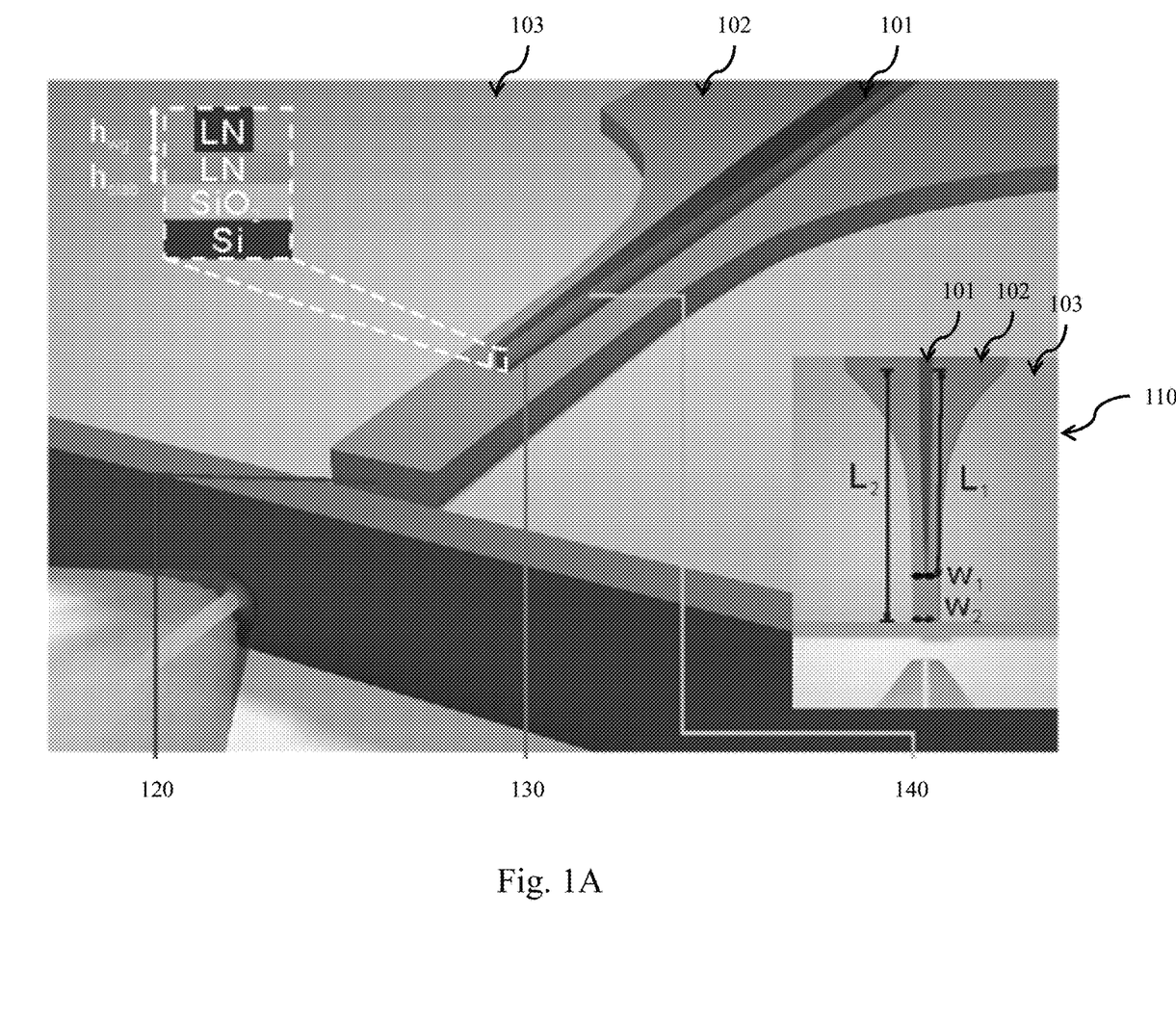
FIG. 1A is a schematic view of a bilayer tapered waveguide structure of a mode size converter according to embodiments of the present disclosure.
Figure 1B:
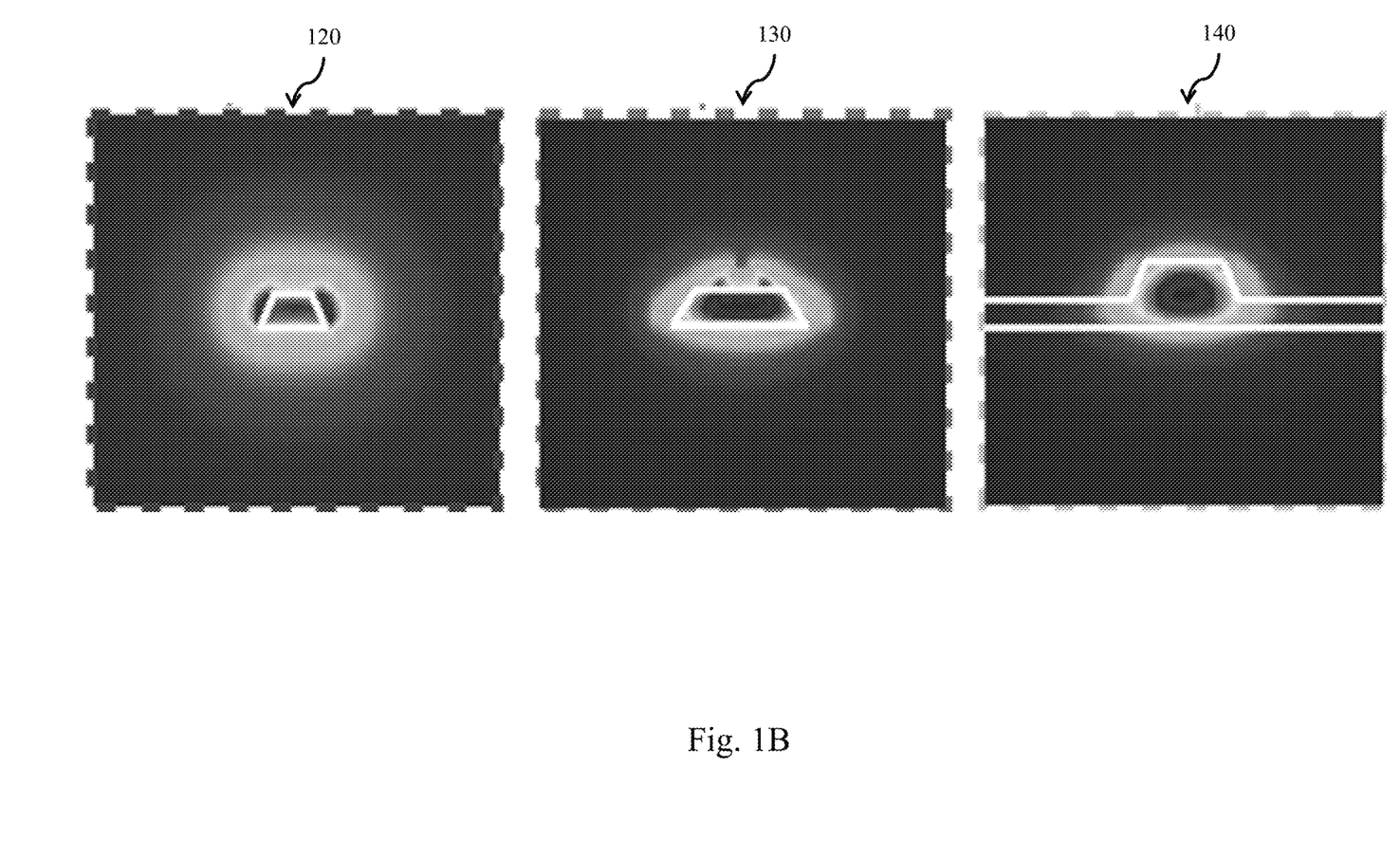
FIG. 1B is a sectional view of the electrical fields of the optical modes at different regions of a bilayer tapered waveguide according to embodiments of the present disclosure.

Referring now to FIG. 1, an exemplary bilayer tapered waveguide structure is illustrated according to embodiments of the present disclosure. FIG. 1A is a schematic of a bilayer tapered waveguide structure of a mode size converter. LN waveguide ridge 101 is dark shaded, and LN slab 102 is buried in SiO$_2$ cladding 103. Insets 110 is a top-down view of the bilayer inverse tapered mode size converter. $L_1$ and $L_2$ are the tapering length of top waveguide ridge 101 and bottom slab layer 102, respectively. In an exemplary embodiment, $L_1$=120 µm, $L_2$=450 µm. $w_1$ corresponds to the width of the bottom-layer taper in the conversion section and $w_2$ is the tip width. In an exemplary embodiment, $w_1$=1.2 µm, $w_2$=340 nm. The widths here are defined as the top side widths of the trapezoids. FIG. 1B provides cross-sectional views of the electrical fields of the optical modes at different regions: tip of the bottom slab layer 120, conversion area where top waveguide ridge just ends 130, and bilayer tapers 140.

FIG. 1A shows the schematic view of an LN mode size converter designed to support a fundamental transverse-electric (TE) optical mode, where in-plane electric fields ($E_z$) interact through the highest electro-optic tensor component of an x-cut LN thin-film. The coupling is based on a gradual variation of the waveguide cross section to a certain point such that better size overlap and index match between modes of the input fiber and nanophotonic waveguides are achieved.

Finite-difference time domain (FDTD) simulations are used to design adiabatic couplers that can match the optical mode of a lensed-single mode fiber (SMF) with a mode field diameter (MFD) of ~2 µm in air ($n_{air}$=1), to the mode of a LN rib waveguide, with MFD ~1.6 µm and SiO$_2$ cladding ($n_{LN}$=2.2, $n_{SiO2}$=1.45). To accomplish this, gradual tapering of both rib and slab portions of the waveguide are used following an exponential function. The top (rib) taper evolves from nominal LN rib waveguide width 800 nm down to a 30-nm point over 120 µm length, which ensures single-mode propagation along the waveguide taper. The bottom (slab) layer taper narrows down laterally from 6 µm to a tip of 340 nm wide with slab height of 250 nm to match the single mode of fiber. The optical mode profiles of the fundamental TE mode at different regions along the LN coupler are shown in FIG. 1B. The mode size becomes larger and more symmetric as light is transferred to the tapered slab layer such that nearly all optical power remains in the target eigenmode. An optimal coupler design has an efficiency as high as 88%.

The MFD obtained here is not the largest possible, but was chosen to match the mode size of the used lensed fiber. It is possible to interface integrated LN devices with larger optical modes by tapering the waveguides to even narrower width.

Figure 2:
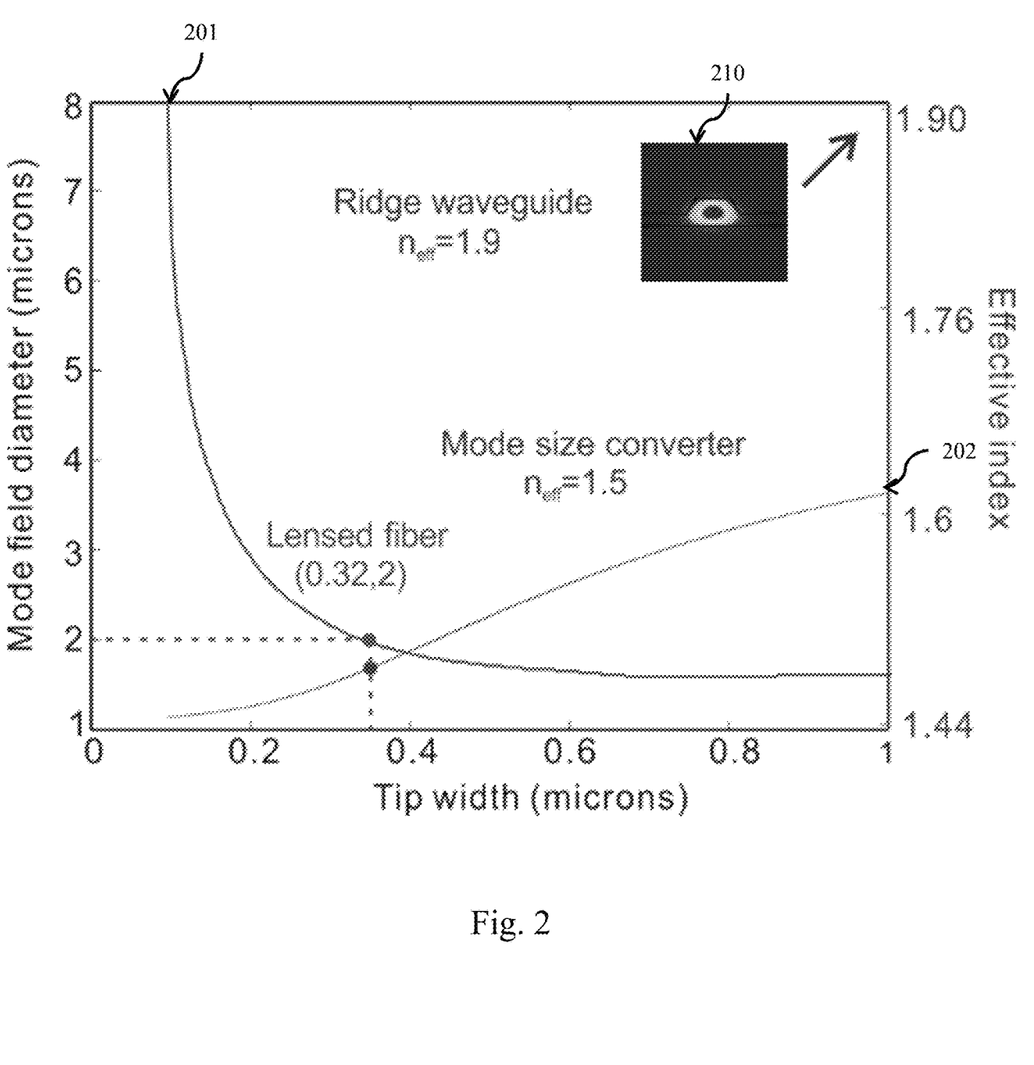
FIG. 2 is a graph of the mode field diameter and effective refractive index versus tip widths of the slab layer according to embodiments of the present disclosure.

Referring to FIG. 2, the mode field diameter (201) and effective refractive index (202) are graphed versus tip widths of the slab layer at the wavelength of 1630 nm. The inset 210 shows the optical profile of the ridge waveguide without mode size converter.

The MFDs of different tip widths $w_2$ are provided changing from 50 nm to 1 µm at the wavelength of 1630 nm, as shown in FIG. 2 (201). The mode size at the chip facet decreases greatly as the taper becomes wider, due to the stronger light confinement (higher refractive index). When the taper is wider than 0.8 µm, the mode diameter grows gradually and finally reaches a plateau. By changing the widths of tip, 1.4-4.5 µm MFD is achieved at the edge of the chip. In addition, the effective refractive index of the ridge waveguide with slab is about 1.9 (210), which can be further reduced from 1.62 to 1.44 with the designed mode size converter (202). Therefore, the index mismatch between lithium niobate photonic integrated devices and lensed fiber is greatly compensated.

Figure 3:
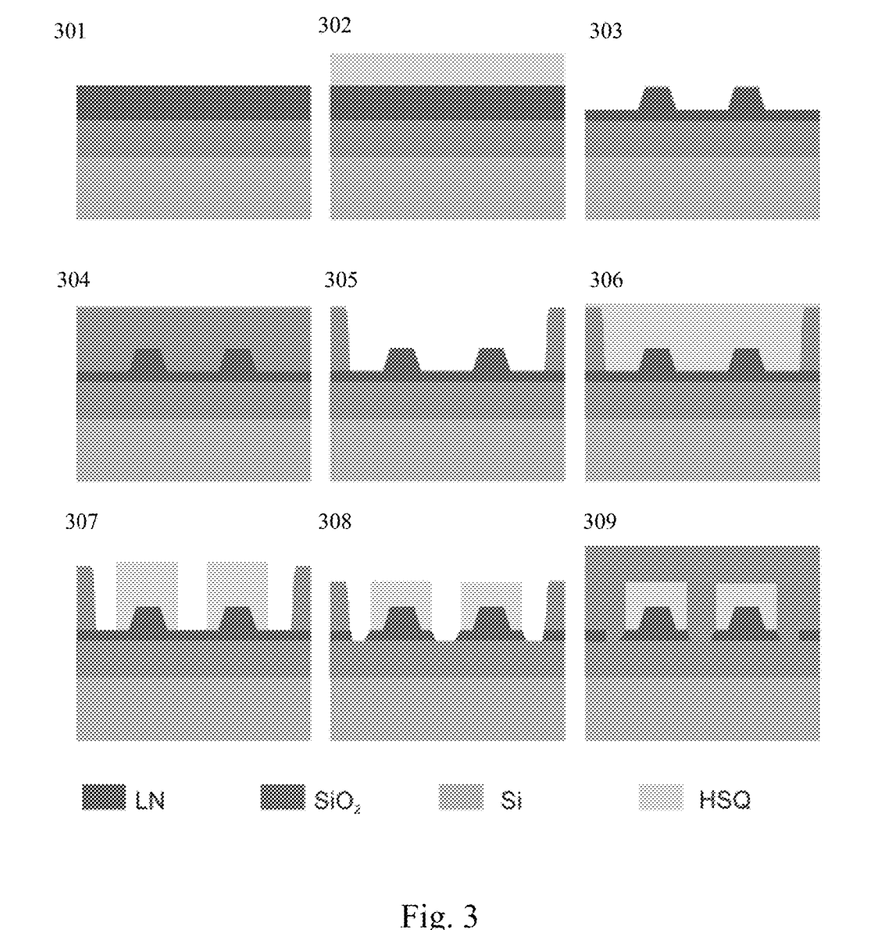
FIG. 3 is a schematic depiction of a device fabrication process according to embodiments of the present disclosure.

Referring now to FIG. 3, an exemplary device fabrication process is illustrated according to embodiments of the present disclosure. An x-cut LNOI substrate (301) is coated (302) with e-beam resist, and photonic patterns are defined using EBL. The patterns are then transferred (303) into LN thin film using a reactive ion etching (RIE). The residue mask materials are removed and a 1 µm thick silica cladding layer is then deposited using PECVD (304). An opening around the corresponding tapering region is formed by using photolithography and wet etching (305). E-beam resist is spun on the surface (306) and the slab taper is patterned using EBL with alignment (307). A second RIE process is performed to transfer the patterns to the LN slab (308). A 1 µm thick PECVD $SiO_2$ is deposited on the top to protect the tapered region (309).

In an exemplary embodiment, the converter is fabricated using an x-cut LN-on-insulator (LNOI) substrate (NANOLN), where a LN thin film (600 nm thick) is bonded on top of silica (2 µm thick) on a silicon substrate handle (0.5 mm thick). The top-down lithography process is utilized, which involved a two-step LN etch process of LNOI wafer: first, a partial LN etch for 350 nm to define a rib, followed by a full etch of the remaining 250 nm slabs in selected regions. In the first step, the waveguide and top taper are etched, where the patterns were defined using electron beam lithography (EBL) and transferred 350 nm deep into LN thin film using argon ion etching (RIE). The waveguides were then cladded by depositing 1 µm of $SiO_2$ using plasma-enhanced chemical vapor deposition (PECVD). Photolithography and wet etching are then employed to open a window in the cladding around the corresponding tapering region. After a second layer of aligned EBL and RIE, the second taper layer is defined and cladded with PECVD SiO2. The facets of the final devices were etched to reduce roughness and to ensure good coupling from and to the optical fibers.

Figure 4A:
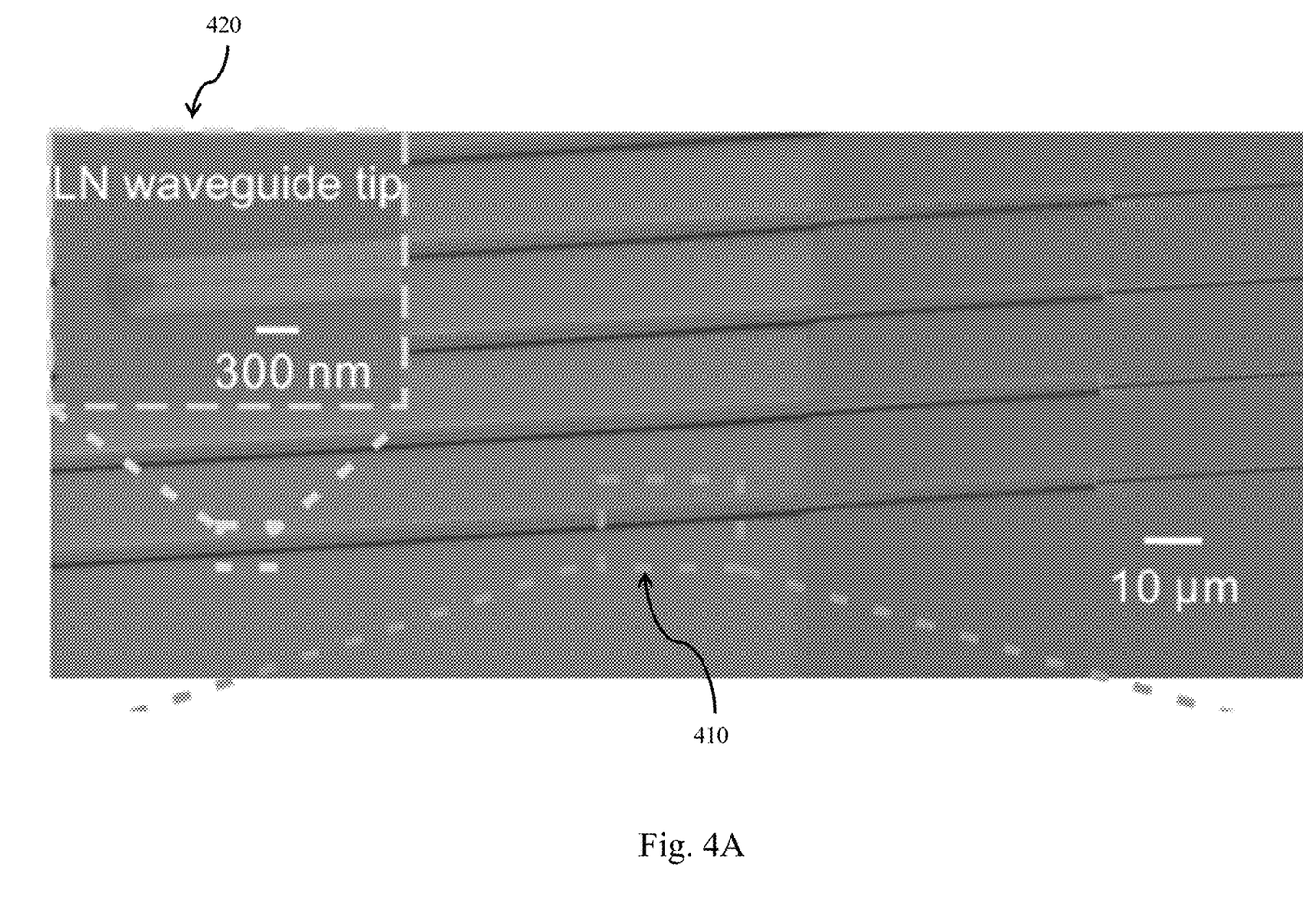
FIG. 4A-B are scanning electron microscope images of a fabricated bilayer mode size converter according to embodiments of the present disclosure.
Figure 4B:
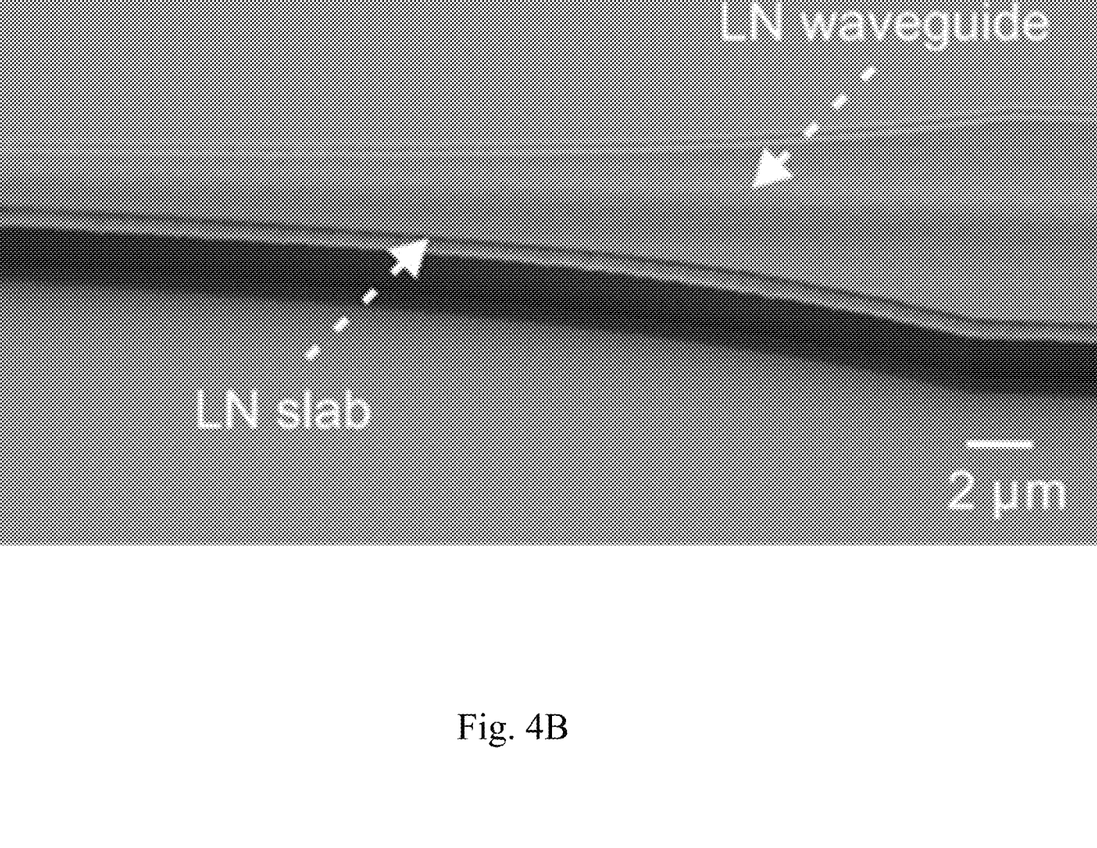

Referring to FIG. 4, scanning electron microscope (SEM) images of a fabricated bilayer mode size converter is provided. These show the structure of the fabricated mode size converter. FIG. 4B provides a close-up of the bottom-layer taper in region 410. The top-layer waveguide is covered by e-beam resist after patterning the slab, so the contour is blurred. Inset 420 shows the etched top-layer waveguide tip.

Figure 5A:
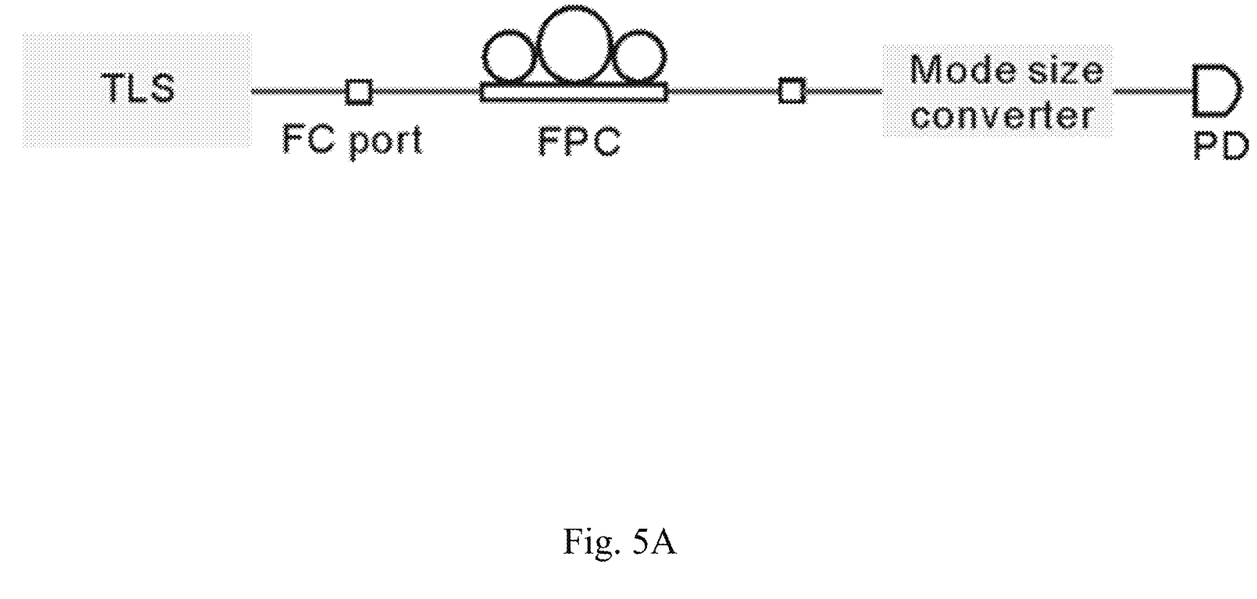
FIG. 5A is a schematic of a fiber-to-chip characterization setup according to embodiments of the present disclosure.

FIG. 5A is a schematic of a fiber-to-chip characterization setup. Light from the tunable laser source (TLS) is coupled into the device after passing through a fiber polarization controller (FPC).

Figure 5B:
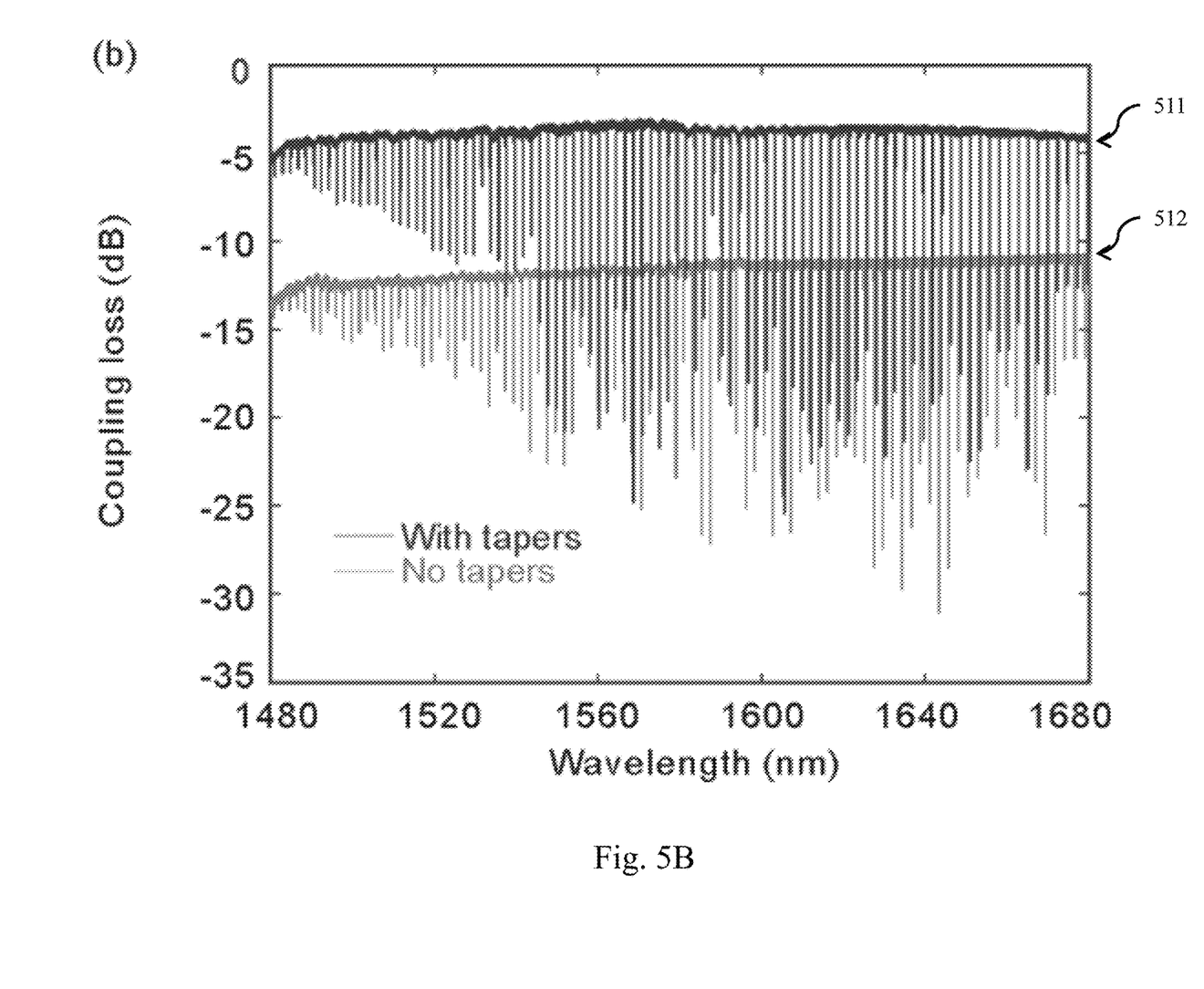
FIG. 5B is a graph of coupling loss versus wavelength, showing calibrated transmission spectra for LN waveguides coupled to ring resonators according to embodiments of the present disclosure.

FIG. 5B shows calibrated transmission spectra for LN waveguides coupled to ring resonators, with (511) and without (512) coupler, resulting in fiber-to-fiber insertion loss of 14 dB and 3.4 dB, respectively. Dips correspond to cavity resonances, featuring $Q_{loaded}=1.5\times10^6$.

A transmission setup may be used to measure the fiber-to-fiber insertion losses of LN chips with and without mode size converter (FIG. 5A). A tunable telecom external cavity diode laser is used to excite the devices, and transmitted light is collected and detected using an InGaAs photodetector. A piezo-controlled micropositioner is used to precisely control the motion of the tapered-lensed fiber to achieve optimal coupling with the chip. A fiber polarization controller is used to ensure TE input polarization and maximizes the transmitted laser light. Microring resonators are fabricated on the chip to confirm that the transmission observed are not from slab modes. FIG. 5B displays the broadband transmission spectra of the on-chip LN mode size converter coupled to the tapered-lensed fiber, which exhibits a series of dips attributed to localized TE-polarized microring resonances (511). The coupling loss decreases from 11-14 dB (512) to ~3-5 dB (511) from 1480 nm to 1680 nm after introducing the mode size converter. Both waveguides, with and without mode size converter, are 4 mm long and are on the same chip. On chip propagation losses of the waveguide are experimentally confirmed using the measured quality factor (Q) of a microring resonator integrated on the same chip as a reference ($Q_{loaded}\sim1.5\times10^6$). The high quality factor indicates that the 4 mm waveguides have a propagation loss of <0.05 dB. Therefore, the overall insertion loss measured is due to fiber-chip coupling. This series of measurements is carried out for devices with different slab tip widths, finding a minimum fiber-to-fiber insertion loss of 3.4 dB (511) for a tip width of 340 nm. The device was also tested with high optical powers above 1 W for continuous operation of more than 1 hour, which is important for nonlinear applications.

Figure 6A:
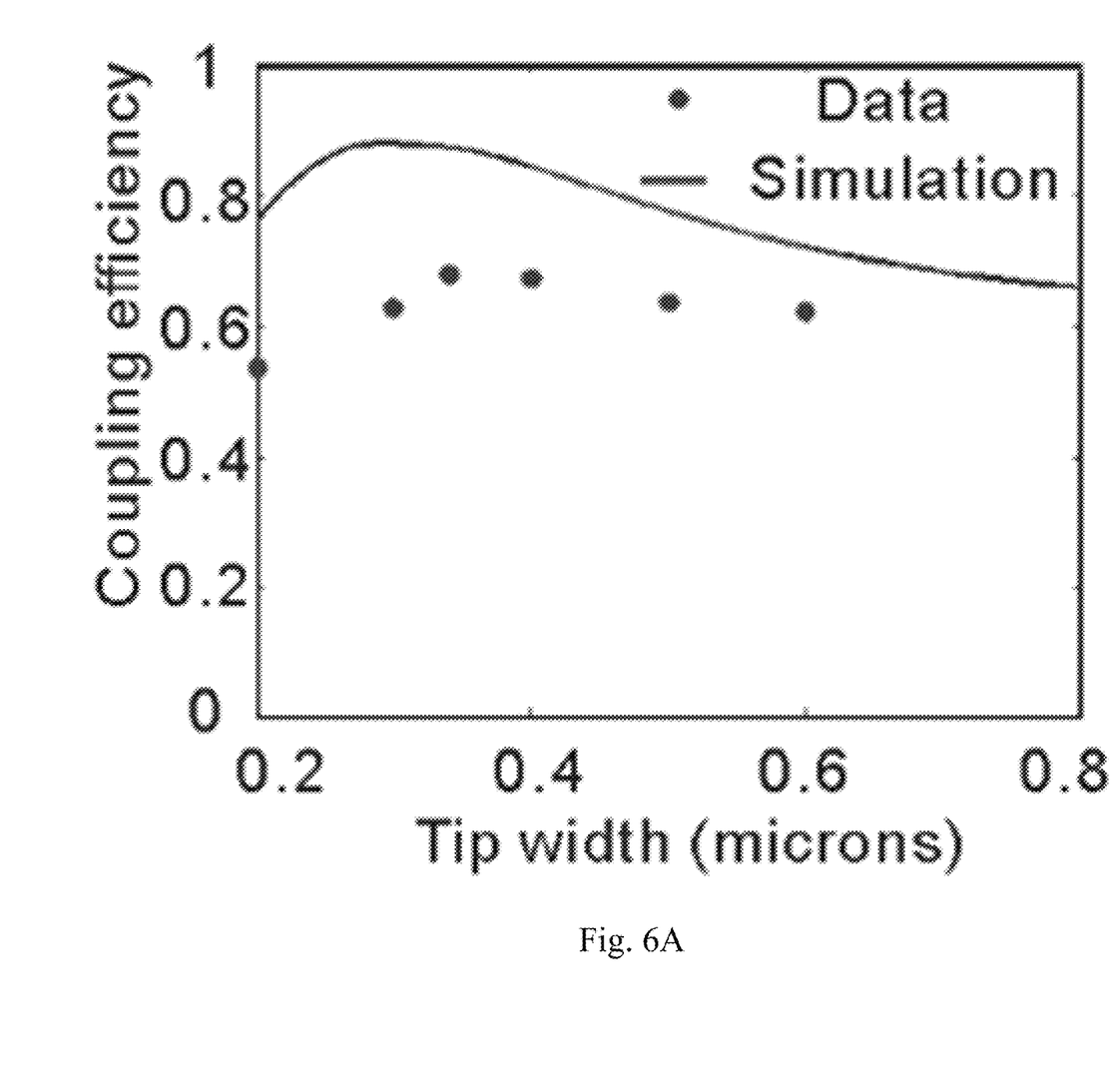
FIG. 6A is a graph of coupling efficiency versus tip width of the tapered slab region according to embodiments of the present disclosure.
Figure 6B:
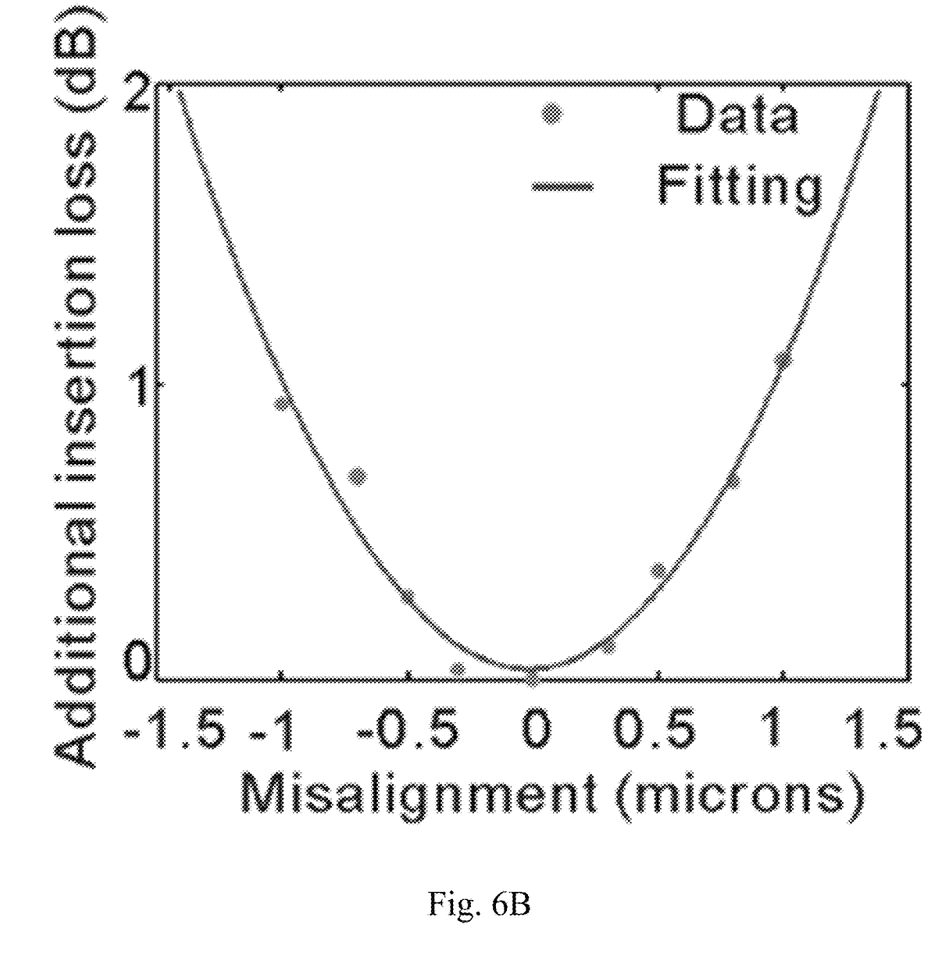
FIG. 6B is a graph of insertion loss versus misalignment of the bilayer nanotaper according to embodiments of the present disclosure.

FIG. 6A shows simulated (curve) and measured (dots) coupling efficiency versus different tip widths of the tapered slab region. FIG. 6B shows insertion loss of the bilayer nanotaper as a function of fiber-chip misalignment (TE mode).

The experimentally measured coupling efficiencies are compared for different taper widths, and find them in good agreement with theoretical predictions (FIG. 6A). The difference in the experimental data and simulation may be attributed to misalignment in the two-tapers, etch depths of rib waveguides, and other fabrication imperfections. The misalignment tolerance of the optical fiber are also measured at a wavelength of 1570 nm for TE polarization. The input fiber is mounted on the motorized stage and scanned over 4 µm in the horizontal plane while the distance between the input fiber and chip facet is fixed at the confocal point of lensed fiber. The measured alignment tolerance for 1 dB excess loss is ±1 µm for transverse directions, as shown in FIG. 5B. The alignment tolerance agrees with the estimate of the mode size.

In conclusion, the above demonstrates a monolithic bilayer LN mode size converter for efficient fiber coupling to nanophotonic waveguides. The mode size converter consists of two-layer taper, implemented using a two-step dry etching process, that gradually decreases the width of both rib and slab portions of LN waveguide. Using this approach, the insertion loss is reduced from 14 dB to 3.4 dB, with more precise fabrication techniques yielding <1 dB. The high coupling efficiency and alignment tolerance enable optical packaging of LN devices, and facilitates various practical applications in LN integrated photonics.

The approaches provided herein are applicable to coupling to standard, cleaved, optical fibers (e.g., Corning SMF28, with the MFD of 10.4±0.5 µm at 1550 nm) using high numerical aperture fiber (MFD~3.2 µm) as an intermediary. This method may be employed to couple light efficiently from SMF28 to silicon waveguide with an overall coupling loss less than 1.5 dB.

Figure 7A:
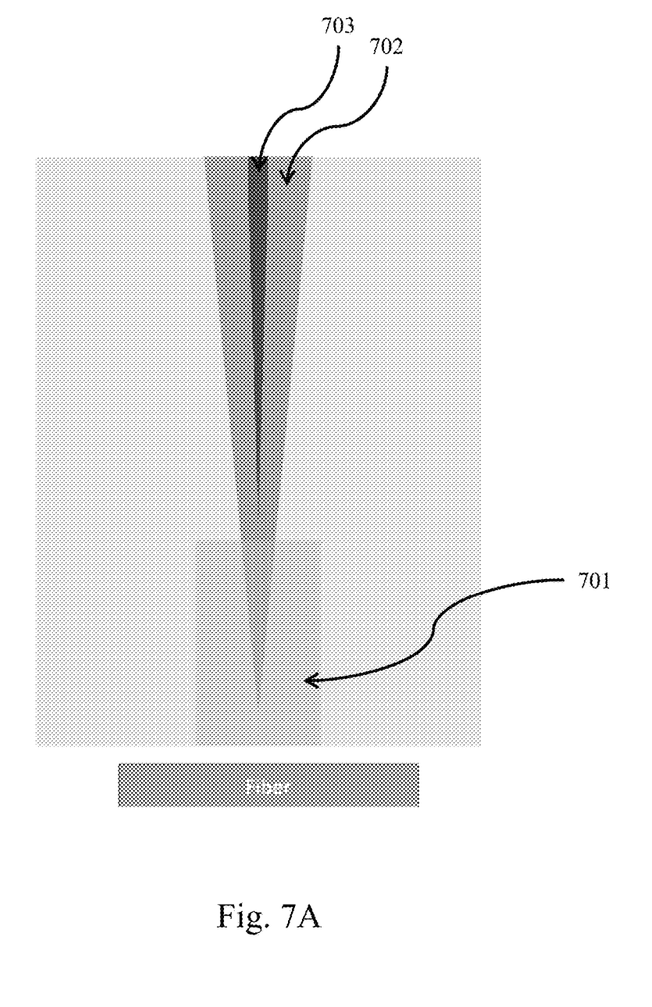
FIG. 7A is a plan view of an optical guide according to embodiments of the present disclosure.
Figure 7B:
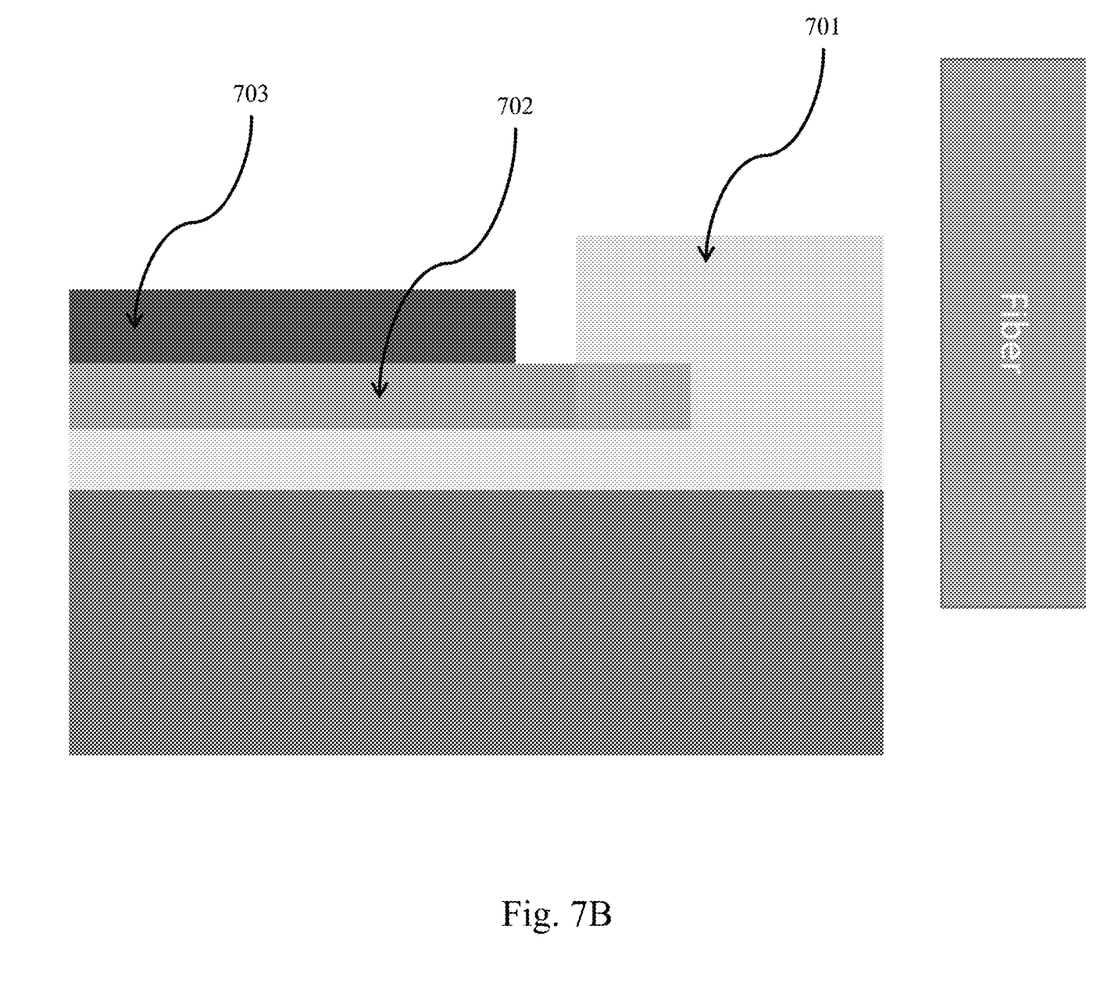
FIG. 7B is a side view of an optical guide according to embodiments of the present disclosure.

Referring to FIGS. 7A-B, an optical guide is illustrated according to embodiments of the present disclosure. In this example, optical guide 701 is disposed on slab portion 702 of a waveguide that includes elevated portion 703. In some embodiments, optical guide 701 is coaxial with elevated portion 703, and extends beyond elevated portion 703 along its central axis, as pictured. In some embodiments, optical guide 701 comprises a low refractive index material. In some embodiments, optical guide 701 overlaps elevated portion 703, while in some embodiments it does not.

As used herein, a low refractive index material is a material having a refractive index of n≤2.25 at normal temperature and pressure (20° C./293.15 K/68° F. and 1 atm/14.696 psi/101.325 kPa).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical circuit, comprising:
a waveguide comprising an electro-optical material,
the waveguide including an elevated ridge and a slab underlying the elevated ridge, the elevated ridge and the slab extending along a central axis toward an optical interface;
the elevated ridge and the slab each having a plurality of cross-sections along the central axis, each cross-section having a width measured perpendicular to the central axis, wherein the width of elevated ridge is smaller than the width of the slab for every cross-section along the central axis, wherein the elevated ridge is trapezoidal in cross-section,
the elevated ridge including a tapered portion having a first taper, wherein the cross-section of the elevated portion decreases along the central axis toward the optical interface;
the slab including a tapered portion having a second taper, wherein the cross-section of the slab decreases along the central axis toward the optical interface, wherein:
the slab extends beyond the elevated ridge along the central axis to the optical interface; and
an optical fiber optically coupled to said waveguide,
wherein an optical coupling loss associated with the optical coupling between the optical fiber and the waveguide is equal to or less than 1.7 dB/facet at an operating wavelength of 1570 nm, 1680 nm, or any wavelength therebetween.

2. The optical circuit of claim 1, wherein the electro-optical material comprises lithium niobate or lithium tantalate.

3. The optical circuit of claim 1, wherein the first taper and the second taper, each independently, is defined by a curve selected from the group consisting of linear and polynomial.

4. The optical circuit of claim 1, further comprising:
a substrate underlying the slab.

5. The optical circuit of claim 4, wherein the substrate comprises silicon, quartz, sapphire, fused silica, or lithium niobate.

6. The optical circuit of claim 1, further comprising:
a cladding disposed on the waveguide, the cladding comprising a dielectric material.

7. The optical circuit of claim 1, further comprising:
an optical guide disposed on the slab along the central axis,
the optical guide being in optical communication with the elevated ridge,
the optical guide extending beyond the elevated ridge along the central axis toward the optical interface,
wherein the optical guide has a refractive index of 2.25 or less.

8. The optical circuit of claim 1, wherein an alignment tolerance between the optical fiber and the waveguide is ±1 μm or less for transverse directions.

9. The optical circuit of claim 1, wherein the operating wavelength is any of 1570 nm and 1630 nm.

10. A method, comprising:
using an optical fiber to direct a guided mode to an optical interface of a waveguide, the waveguide comprising an electro-optical material,
wherein:
the waveguide includes an elevated ridge and a slab underlying the elevated ridge, the elevated ridge and the slab extending along a central axis toward the optical interface;
the elevated ridge and the slab each has a plurality of cross-sections along the central axis, each cross-section having a width measured perpendicular to the central axis, wherein the width of elevated ridge is smaller than the width of the slab for every cross-section along the central axis, wherein the elevated ridge is trapezoidal in cross-section,
the elevated ridge includes a tapered portion having a first taper, wherein the cross-section of the elevated portion decreases along the central axis toward the optical interface;
the slab includes a tapered portion having a second taper, wherein the cross-section of the slab decreases along the central axis toward the optical interface, wherein:
the slab extends beyond the elevated ridge along the central axis to the optical interface,
wherein an optical coupling loss associated with the optical coupling between the optical fiber and the waveguide is equal to or less than 1.7 dB/facet at an operating wavelength of 1570 nm, 1680 nm, or any wavelength therebetween.

11. The method of claim 10, wherein the electro-optical material comprises lithium niobate or lithium tantalate.

12. The method of claim 10, wherein the first taper and the second taper, each independently, is defined by a curve selected from the group consisting of linear and polynomial.

13. The method of claim 10, wherein a substrate underlies the slab.

14. The method of claim 13, wherein the substrate comprises silicon, quartz, sapphire, fused silica, or lithium niobate.

15. The method of claim 10, wherein a cladding is disposed on the waveguide, the cladding comprising a dielectric material.

16. The method of claim 10, wherein:
an optical guide is disposed on the slab along the central axis,
the optical guide is in optical communication with the elevated ridge,
the optical guide extends beyond the elevated ridge along the central axis toward the optical interface,
the optical guide has a refractive index of 2.25 or less.

17. The method of claim 10, wherein the first taper and the second taper, each independently, is defined by an exponential curve.

18. The method of claim 10, wherein an alignment tolerance between the optical fiber and the waveguide is +1 μm or less for transverse directions.

19. The method of claim 10, wherein the operating wavelength is any of 1570 and 1630 nm.

20. An optical circuit, comprising:

a waveguide comprising an electro-optical material,
the waveguide including an elevated ridge and a slab underlying the elevated ridge, the elevated ridge and the slab extending along a central axis toward an optical interface;
the elevated ridge and the slab each having a plurality of cross-sections along the central axis, each cross-section having a width measured perpendicular to the central axis, wherein the width of elevated ridge is smaller than the width of the slab for every cross-section along the central axis, wherein the elevated ridge is trapezoidal in cross-section,
the elevated ridge including a tapered portion having a first taper, wherein the cross-section of the elevated portion decreases along the central axis toward the optical interface;
the slab including a tapered portion having a second taper, wherein the cross-section of the slab decreases along the central axis toward the optical interface, wherein:
the slab extends beyond the elevated ridge along the central axis to the optical interface, and
wherein the first taper and the second taper, each independently, is defined by an exponential curve.

* * * * *